United States Patent [19]

Wirtz

[11] Patent Number: 4,858,139
[45] Date of Patent: Aug. 15, 1989

[54] PROCESS AND EXTRUSION APPARATUS FOR EXTRUDING A PLASTIC WEB

[75] Inventor: Robert Wirtz, Troisdorf, Fed. Rep. of Germany

[73] Assignee: Reifenhauser GmbH & Co. Maschinenfabrik, Troisdorf, Fed. Rep. of Germany

[21] Appl. No.: 240,257

[22] Filed: Sep. 2, 1988

[30] Foreign Application Priority Data

Sep. 8, 1987 [DE] Fed. Rep. of Germany ....... 3730043

[51] Int. Cl.⁴ .................. B29C 43/58; B29C 47/92
[52] U.S. Cl. ........................ 364/473; 100/47; 100/168; 100/176; 264/40.7; 264/175; 264/210.2; 364/476; 425/145; 425/327; 425/367; 425/382.3
[58] Field of Search .............. 264/40.1, 40.7, 175, 264/210.2; 425/135, 145, 327, 367, 382.3; 100/47, 168, 173, 176; 364/473, 476, 558, 565

[56] References Cited

U.S. PATENT DOCUMENTS

| | | | |
|---|---|---|---|
| 3,359,597 | 12/1967 | Bainton | 425/145 |
| 4,028,031 | 6/1977 | Seide | 425/327 X |
| 4,238,432 | 12/1980 | Henderson et al. | 264/40.7 |
| 4,260,578 | 4/1981 | Moody | 264/40.7 |
| 4,304,539 | 12/1981 | Hagiwara et al. | 425/145 |
| 4,428,896 | 1/1984 | Stevenson | 264/40.1 |
| 4,484,879 | 11/1984 | Heinz et al. | 425/145 |
| 4,510,104 | 4/1985 | Weaver et al. | 264/40.7 |
| 4,514,812 | 4/1985 | Miller et al. | 364/473 |

FOREIGN PATENT DOCUMENTS 368946 11/1982 Austria .
59-164124 9/1984 Japan ..................... 425/145

Primary Examiner—Jeffery Thurlow
Assistant Examiner—Leo B. Tentoni
Attorney, Agent, or Firm—Herbert Dubno

[57] ABSTRACT

A plastic web is made by an extrusion apparatus having a plastics screw press, a metering pump with a volume flow depending on the rotation speed, an output die and a rolling unit with calendaring rolls. The flow of a thermoplastic material is regulated with the metering pump. The melt web issuing from the output die is cooled and calibrated. The process uses a metering pump which has substantially linear volume flow/rotation speed characteristics in the regulated range of rotation speeds and together with the rolling unit is part of a common computerized control system. The peripheral speed of the calendaring rolls is controlled so that it is proportional to the rotation speed of the metering pump. The special proportionality factor for the speed ratio is set by a computer which controls the roll speed so that no undesirable thickness variations or other product defects occur. Also additional components including a computer and controller which regulates the roll speed are provided to the extrusion apparatus so that the process according to my invention can be performed.

6 Claims, 1 Drawing Sheet

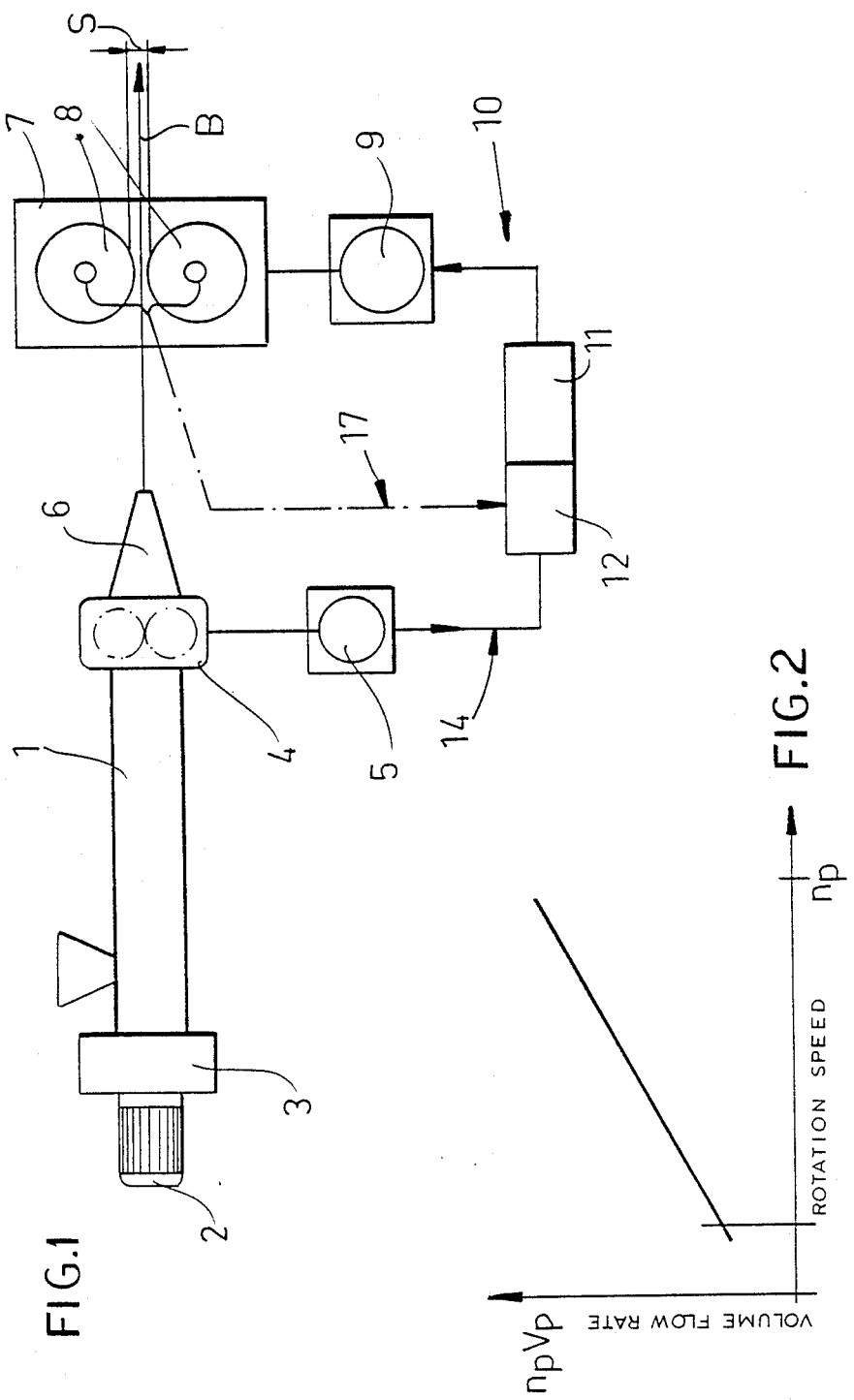

PROCESS AND EXTRUSION APPARATUS FOR EXTRUDING A PLASTIC WEB

FIELD OF THE INVENTION

My present invention relates to a process and apparatus for extrusion of a plastic product and, more particularly, for controlled extrusion of a plastic web.

BACKGROUND OF THE INVENTION

A plastic web can be made with an extrusion apparatus comprising a plastic-material displacing screw press, a metering pump with a volume flow rate depending on rotation speed, a wide-mouth or broad-slit output die and a rolling unit with a plurality of smoothing rolls in which the flow of a melt of thermoplastic material is regulated by the metering pump and a melt web issuing from the output die is cooled and calibrated in the rolling unit.

The rotation speed of the metering pump and the peripheral speed of the smoothing rolls are adjusted or set depending on each other to preserve a steady flow.

By "plastic web" I mean a plastic foil, a plastic laminate web or plastic plate.

In the known process, an adjustment of the peripheral speed of the smoothing rolls depending on the rotation speed of the metering pump is performed manually.

Generally the peripheral speed and the rotation speed can be kept constant by regulating steps or features. The manual adjustment occurs by an operator according to visual observations of the plastic web being extruded. Furthermore the melt bulge or bank upstream of the gap or nip between the calendaring rolls is observed. The quality of the plastic web in regard to thickness, the shape of the thickness profile and the surface depends on the experience of the operator. Unavoidable variations of the rotation speed and thus the volume flow rate of the metering pump cannot be taken into account during operation and can impair of the quality of the product.

OBJECTS OF THE INVENTION

An object of my invention is to provide an improved process and apparatus for extrusion as described in which manual adjustment is no longer necessary.

It is also an object of my invention to provide a fully automatic and improved process and extrusion apparatus for making a plastic web in which the product quality in regard to thickness, thickness profile (distribution across the width of the web) and the surface (finish) is carefully controlled.

It is a further object of my invention to regulate the mass flow rate from an output die of an extrusion apparatus having a rolling unit downstream of its output die and also the peripheral speed of the rolls of the rolling unit so that a product of satisfactory quality results.

SUMMRY OF THE INVENTION

These objects and others which will become more readily apparent hereinafter are attained in accordance with my invention in a process and apparatus for making a plastic web including a plstics screw press, a metering pump with a volume flow rate depending on the rotation speed, an output die and a rolling unit with a plurality of calendaring rolls.

According to my invention the metering pump has a substantially linear volume-flow-rate/rotation-speed-characteristic in the regulated range of rotation speeds (i.e. the extrusion range of the pump) and together with the rolling unit is part of a common computerized control system and control loop. The rolling unit in the control system is operated with a peripheral speed for the calendaring rolls which is proportional to the rotation speed of the metering pump and a proportionality factor (or speed ratio) which is given by the relationship:

$$\rho_1 \cdot V_p / \rho_2 \cdot S \cdot B$$

is set by the compuer, wherein $\rho_1$ indicates the fixed density of the melt in the volume flow; $V_p$, the flow volume per rotation of the metering pump; $\rho_2$, the fixed density of the plastic web in the roll nip between the calendaring rolls; S, the height of the roll nip between the calendaring rolls and B, the width of the plastic web and $\rho_1$, $V_p$, $\rho_2$, S and B, or signals corresponding to them, are inputted to the computer.

According to a preferred embodiment of my invention the metering pump operates without pulsations. It is understood that the predetermined rotation speed of the metering pump can be maintained approximately constant by control engineering methods. The parameters $\rho_1$, $\rho_2$ and $V_p$ are dependent on the melt temperature upstream and downstream of the metering pump, the temperature dependent viscosity in the melt, the raw materials used and their density. Furthermore the height of the roll nip can be measured and controlled according to a predetermined set value. Thus one can input the measured height of the roll nip to the computer.

My invention is based on the fact that the metering pump which is provided in the extrusion apparatus for which the process of my invention is designed feeds a certain constant flow volume $V_p$ for each rotation and thus has a linear volume-flow-rate/rotation-speed characteristic curve. The volume-flow rate increases linearly with increasing rotation speed $n_p$ of the metering pump. With the melt density of the raw material $\rho_1$ then the mass flow rate m is given by the following relationship:

$$m = \rho_1 V_p n_p \tag{1}$$

For a given gap height S of the calendaring rolls and a given width B of the plastic web the peripheral speed $v_w$ of the calendaring rolls for a steady state:

$$V_w = m/(\rho_2 \cdot S \cdot B) \tag{2}$$

With the mass flow rate m given by equation (1) so that equation (2) becomes $$V_w = \rho_1 \cdot V_p \cdot n_p / \rho_2 \cdot S \cdot B \tag{3}$$

Both independent variables $n_p$ and $v_w$ can be related in a control loop allowing for the foil dimensions by equation (1) and (3) as my invention teaches.

The additional automatic measurement and adjustment of the height of the roll nip between the calendaring rolls allows an automatic operating point observation and change without separate adjustment and control of the pump speed, peripheral speed of the calendaring rolls and roll nip between the calendaring rolls.

Usually manufacture of plastic web with a thickness of less than 0.5 mm with an extrusion apparatus of the desired structure is particularly difficult because with decreasing height of the roll nip between the calendaring rolls exponentially increasing deforming pressures occur in the roll nip. The resulting forces usually lead to bending of the calendaring rolls and then a so-called swelling of the roll nip.

Moreover troublesome influences on the thickness distribution across the plastic web occur, and of course both of the longitudinal and transverse direction.

The described forces in the roll nip between the calendaring rolls depend also on the magnitude of the melt bank in front of the roll nip. A decreasing thickness of this melt bank leads to smaller gap forces. Throughput variations of the plastic screw press change the thickness of the melt bank so that calendaring faults or flaws can occur. That does not occur in my process. If one uses a metering pump which is pulsation-free then the described disturbing influences are further minimized.

The present invention also provides an extrusion apparatus for performing the process according to my invention comprising a plastics screw press, a metering pump with a volume flow rate depending on the rotation speed, a pump drive, an output die, a controller, a computer and a rolling unit with calendaring rolls and a roll drive.

The extrusion apparatus according to my invention is however characterized by a metering pump and a rolling unit which are part of a computerized control system for the peripheral speed of the calendaring rolls depending substantially linearly on the rotation speed of the metering pump and the computer of course determines the proportionality factor, $\rho_1 V_p/\rho_2 SB$. The computer then sets the roll drive according to this proportionality factor.

The method of the invention can then comprise the steps of:

(a) determining a rotation speed of the pump as a measure of a mass flow from the output die;

(b) cooling and calibrating a melt web issuing from the output die in the rolling unit;

(c) connecting the roll drive of the rolling unit, the controller, the computer and the metering pump in a computerized control loop; and (d) operating the rolling unit in the control loop with a peripheral speed for the calendaring rolls which is linearly proportional to the rotation speed of the metering pump with a proportionality factor which is given by the relationship:

$$\rho_1 V_p/\rho_2 SB$$

where $\rho_1$ indicates the fixed density of the melt; $V_p$, the flow volume per complete rotation of the metering pump; $\rho_2$, is a predetermined density of the plastic web in a roll nip between the calendaring rolls; S is a height of the roll nip between the calendaring rolls and B is a width of the plastic web by inputting values of the $\rho_1$, $V_p$, $\rho_2$, S and B to the computer and controlling the controller for the roll drive by the computer.

BRIEF DESCRIPTION OF THE DRAWING

The above and other objects, features and advantages of my invention will become more readily apparent from the following description, reference being made to the accompanying highly diagrammatic drawing in which:

FIG. 1 is a schematic diagram of an extrusion apparatus which is equipped to perform the process according to my invention; and FIG. 2 is a graphical illustration of the volume-flow-rate/rotation-speed-characteristic of the metering pump of the apparatus of FIG. 1.

SPECIFIC DESCRIPTION

The extrusion apparatus shown in the drawing has a thermoplastic-plastification and liquefying screw press 1 with connected drive motor 2 and gear unit 3, a metering pump 4 with a pump drive 5 which has a volume flow rate dependent on rotation speed, a tapered broad-slit output die 6 and a rolling unit 7 with two calendaring rolls 8 with an associated roll drive 9.

The metering pump 4 and the rolling unit 7 are part of a computerized control system 10 for controlling the peripheral speed of the calendaring rolls 8 and are connected in a control loop 14.

The regulated speed of the calendaring rolls 8 is substantially linearly dependent on the rotation speed of the metering pump 4. The control system 10 and the control loop 14 have a controller 11 and a computer 12 which calculate the previously specified proportionality factor (ratio of the peripheral speed of the calendaring rolls to the rotation speed)

$$\rho_1 V_p/\rho_2 SB$$

to determine what the correct peripheral speed for the calendaring rolls 8 should be from the pump speed. The densities $\rho_1$ and $\rho_2$ and the other raw material-dependent parameters are inputted to the computer 12. That is also true for the volume-flow rate $n_p V_p$, the height of the roll nip S and the width of the plastic web B.

In another advantageous feature of my invention the height of the roll nip S can be regulated in another control loop 17 including the computer 112 and the controller 11 as well as the roll drive 9.

It is especially convenient when the mass flow rates and other parameters are chosen so that one works in the range of rotation speeds where the volume flow rate from the pump 4 depends linearly on the pump speed, i.e. in a range where the flow volume per rotation is constant.

I claim:

1. In a process for making a plastic web with an extrusion apparatus comprising a screw press, a metering pump with a volume flow rate depending on a rotation speed of said meter pump, an output die and a rolling unit with a plurality of calendaring rolls in which a flow of a melt made of thermoplastic material is regulated with said metering pump and a melt web issuing from said output die is cooled and calibrated in said rolling unit, said rotation speed of said metering pump over a regulated range thereof and the peripheral speed of said calendaring rolls being settable independently of each other, the improvement wherein said metering pump has a substantially linear volume-flow-rate/rotation-speed characteristic in the regulated range of said rotation speed and together with said rolling unit is part of a common computerized control system having a computer, said rolling unit in said control system being operated with said peripheral speed for said calendaring rolls which is proportional to said rotation speed of said metering pump in accordance with a proportionality factor which is given by the relationship:

$$\rho_1 V_p/\rho_2 SB$$

and said peripheral speed is determined by said computer, where $\rho_1$ indicates a predetermined density of said melt in the volume-rate of flow; $V_p$, is the flow volume per complete rotation of said metering pump; $\rho_2$ is a predetermined density of said plastic web in a roll nip between said calendaring rolls; S is a height of said roll nip between said calendaring rolls and B is a width of said plastic web and said $\rho_1$, $V_p$, $\rho_2$, S and B are inputted to said computer.

2. The improvement according to claim 1 wherein said metering pump is operated without pulsations.

3. The improvement according to claim 1 wherein said height of said roll nip between said calendaring rolls is measured and is adjusted according to a predetermined set value.

4. The improvement according to claim 3 wherein said height of said roll nip is also measured and inputted into said computer.

5. An extrusion apparatus for making a plastic web comprising a screw press, a metering pump with a volume flow rate depending on the rotation speed of said metering pump, an output die and a rolling unit with a plurality of calendaring rolls, the improvement wherein said metering pump and said rolling unit are part of a computerized control system including a computer for a peripheral speed of said calendaring rolls depending substantially linearly on said rotation speed of said metering pump and said control system has a computer which determines a proportionality factor as the ratio of said peripheral speed to said rotation speed $$\rho_1 V_p / \rho_2 SB$$

where $\rho_1$ indicates a predetermined density in the volume-rate of flow of said melt; $V_p$ is the flow volume per complete rotation of said metering pump; $\rho_2$ is a predetermined density of said plastic web in a roll nip between said calendaring rolls; S is a height of said roll nip between said calendaring rolls and B is a width of said plastic web and said $\rho_1$, $V_P$, $\rho_2$, S and B are inputted to said computer.

6. A process for making a plastic web with an extrusion apparatus having a screw press, a metering pump with a volume flow depending substantially linearly on the rotation speed of said metering pump, a broad-slit output die, a computer, a controller and a rolling unit with a plurality of calendaring rolls comprising:
 (a) determining a rotation speed of said pump as a measure of a mass flow from said output die;
 (b) cooling and calibrating a melt web issuing from said output die in said rolling unit;
 (c) connecting said roll drive of said rolling unit, said controller, said computer and said metering pump in a computerized control loop; and
 (d) operating said rolling unit in said control loop with a peripheral speed for said calendaring rolls wnhich is linearly proportional to said rotation speed of said metering pump with a proportionality factor which is given by the relationship:

$$\rho_1 V_p / \rho_2 SB$$

where $\rho_1$ indicates the fixed density of said melt; $V_p$, the flow volume per complete rotation of said metering pump; $\rho_2$, is a predetermined density of said plastic web in a roll nip between said calendaring rolls; S is a height of said roll nip between said calendaring rolls and B is a width of said plastic web by inputting values of said $\rho_1$, $V_p$, $\rho_2$, S and B to said computer and controlling said controller for said roll drive by said computer.

* * * * *